Oct. 18, 1938. L. A. TROFIMOV 2,133,365
HOIST DRIVE AND CONTROL
Filed July 16, 1937 3 Sheets-Sheet 1
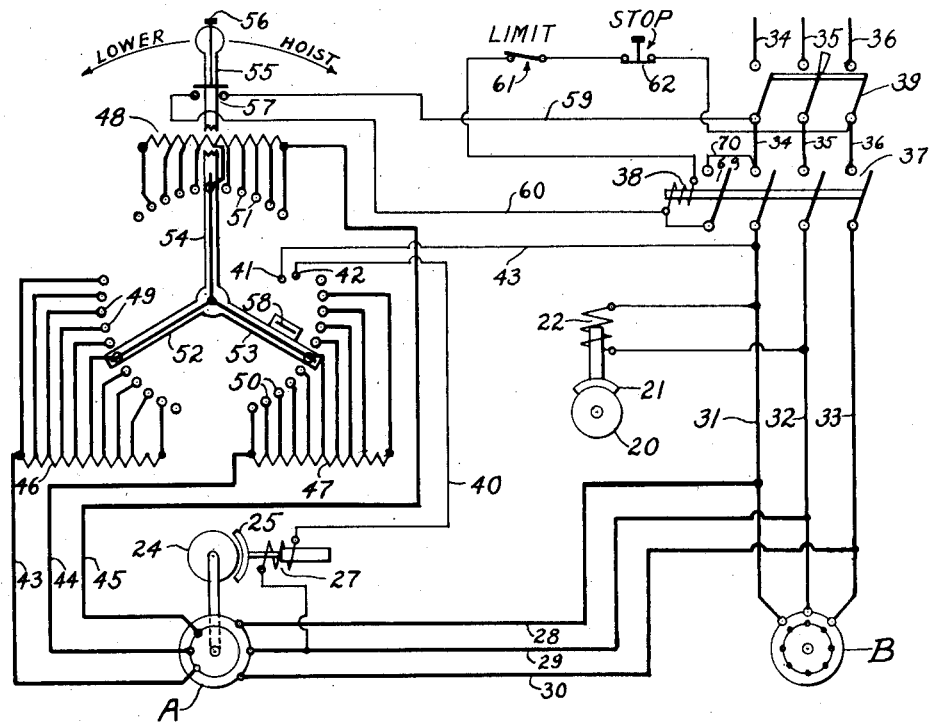
Fig. 2
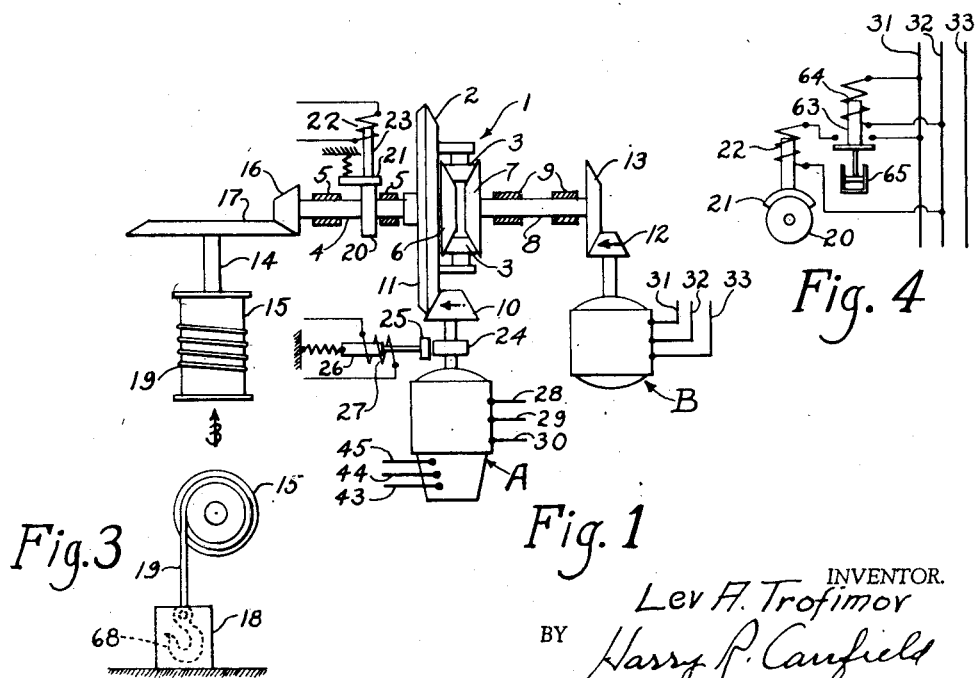
Fig. 3
Fig. 1
Fig. 4
INVENTOR.
Lev A. Trofimov
BY Harry P. Canfield
ATTORNEY.

Oct. 18, 1938.  L. A. TROFIMOV  2,133,365

HOIST DRIVE AND CONTROL

Filed July 16, 1937  3 Sheets-Sheet 2

INVENTOR.
Lev A. Trofimov
BY Harry P. Caufield
ATTORNEY.

Patented Oct. 18, 1938

2,133,365

UNITED STATES PATENT OFFICE 2,133,365

HOIST DRIVE AND CONTROL

Lev A. Trofimov, Cleveland, Ohio, assignor to Product Development and Engineering Corporation, Cleveland, Ohio, a corporation of Ohio Application July 16, 1937, Serial No. 153,957

12 Claims. (Cl. 172—152)

This invention relates to electric control systems and apparatus for controlling the application of electric motor power to various uses.

In some of its aspects, the invention has particular advantages when applied to the control of hoisting apparatus, and will be described as applied to that use, although as will become apparent hereinafter, my invention may be applied with equal advantages to various other uses.

It has heretofore been proposed to transmit the power of an electric motor to the point of use, through gearing of the differential or planetary type. Such gearing consists in general of a rotary frame element, sometimes called the spider, carrying a plurality of toothed pinions rotatable thereon, and a pair of rotary toothed gears each meshed with all of the pinions. In prior uses of such gearing, two motors have been used, one motor being connected to one of the gears and the other motor being connected to the other gear, and power being delivered from the spider; or the said other motor connected to the spider and the power delivered from the said other gear.

In all such prior arrangements, so far as I am aware, it has been necessary to control or vary the speed of both motors, resulting in complexities of the electric control system; or it has been necessary to employ some kind of mechanical slipping brake on one motor to control the speed of the power delivering element of the gearing; or the motors have had to be operated at inefficient speeds to obtain the desired speed range of delivered power.

The present invention contemplates the employment of one variable speed motor, preferably but not necessarily of the alternating current induction type, connected to one of the rotary elements of a differential gearing, and a generator, preferably but not necessarily of the alternating current type connected to another of the elements of the differential gearing and utilizing the third element of the differential gearing to deliver the power, and it co-ordinates and combines certain inherent characteristics of the motor and generator with the inherent characteristics of the differential gearing in a novel manner which overcomes the objections to prior power units of this type, some of which objections are mentioned above.

It is among the objects of the invention:

To provide generally an improved power control and transmission of the type in which an electric motor transmits power through differential gearing;

To provide an improved power control of the class referred to in the preceding paragraph and utilizing an alternating current induction motor and an electric generator in an improved manner;

To provide an improved electric-motor-differential-gear power unit utilizing an alternating current motor within its efficient speed range in an improved manner;

To provide an electric-motor-differential-gearing power transmission of the class referred to in which the torque-speed characteristics of an alternating current squirrel cage induction generator and the variable speed characteristics of a wound rotor slip-ring induction motor are utilized in an improved manner to control the speed at which power is delivered from the gearing;

To provide an improved electric control system for starting and controlling the relative speed of a motor of the alternating current induction type in a motor-differential power unit of the class referred to;

To provide an improved motor driven differential gear transmission power unit of the class referred to comprising a variable speed alternating current electric motor, and a squirrel cage induction motor operating as a generator and so arranged that the speed of the variable speed motor only is varied in providing a wide range of power delivery speeds;

To provide a power control and transmission of the class referred to adaptable with outstanding advantages to the operation of hoists.

To provide a motor-differential power unit of the class referred to in which the power is supplied by a variable speed motor and the speed of the power delivery element of the differential so driven is determined by the speed of an electric generator in an improved manner.

Other objects will be apparent to those skilled in the arts to which my invention appertains.

My invention is fully disclosed in the following description taken in connection with the accompanying drawings in which:

Fig. 1 is a diagrammatic view illustrating a motor and a generator and an apparatus by which my invention in a preferred form may be practiced;

Fig. 2 is a diagrammatic representation of an electric control system for the motor and generator illustrated in Fig. 1;

Fig. 3 is a fragmentary elevational view taken in the direction of the arrow 3 of Fig. 1;

Fig. 4 is a fragmentary view similar to a part of Fig. 2 but illustrating a modification;

Figure 5:
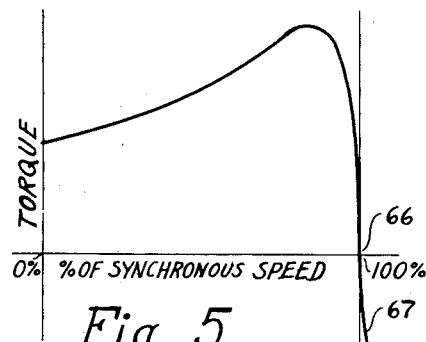
Fig. 5 is a diagrammatic view illustrating certain torque characteristics of a squirrel cage induction generator, which I may employ.

Referring to the drawings, I have shown generally at 1, a differential gearing comprising a frame or spider 2, upon which are rotatively mounted a plurality of pinions 3—3, the spider being rotatable on a rotatable shaft 4 which is supported in bearings 5—5. The pinions 3—3 mesh with a gear 6 secured on the shaft 4; and also mesh with a gear 7 secured on a shaft 8 rotatable in bearings 9—9.

An alternating current motor A having a slip-ring wound rotor has a bevel pinion 10 on its shaft meshed with bevel gear teeth 11 on the spider 2; and a squirrel cage induction generator B has a bevel pinion 12 on its shaft meshed with a bevel gear 13 secured to the shaft 8. The drive shaft 4 is, in the illustrated preferred embodiment of my invention, geared to the shaft 14 of a hoist drum 15 by means of a bevel pinion 16 on the shaft 4 meshed with a bevel gear 17 on the shaft 14; and a load 18 to be raised or lowered by the hoist drum 15 is supported on a cable 19 wound on the drum.

At 20 is a brake drum on the shaft 4 and normally engaged therewith is a brake shoe 21 arranged to be retracted, to discontinue the braking action, by a magnetic winding 22 acting upon a plunger 23 connected to the shoe.

At 24 is a brake drum on the shaft of the motor A and co-operating therewith is a brake shoe 25 normally disengaged from the drum 24 but arranged to be frictionally engaged therewith by movement of a plunger 26 effected by the energization of a magnetic winding 27.

Referring to Fig. 2, the motor A has the primary thereof connected by wires, 28, 29 and 30 to supply wires 31, 32 and 33 which may be connected to three-phase alternating current mains 34, 35, 36, through a three-pole electro-magnetic switch 37 having an operating winding 38. A disconnecting knife switch 39 may be provided outwardly of the switch 37.

The switch 37 is preferably of the normally open type which returns to open position when the winding 38 is de-energized.

The primary of the generator B is also connected to the supply mains by the wires 31, 32 and 33. The generator B is preferably constructed in the form of the conventional squirrel cage induction motor. The speed-torque characteristics of such motors are shown graphically in Fig. 5. When the squirrel cage motor is accelerated from rest and its speed has come up to 100% of synchronous speed, as indicated by the point 66 in Fig. 5, its torque curve is a very steep curve as shown at 67. The curve above the point 66 is the torque curve when load is put upon the shaft of the motor and the curve below the point 66 is the torque curve when power is applied to the rotor and drives it, making of the motor an induction generator. The curve 67, as stated, is a very steep curve so that for a relatively great variation of load on the rotor the speed of the rotor will increase above synchronism within a limited speed range.

As will appear hereinafter, in starting up the apparatus I contemplate starting the generator B of the squirrel cage induction motor to bring it up approximately to synchronous speed and thereafter, in the operation of the hoist control apparatus to be described, it acts as an induction generator. Furthermore, in the operation of the hoist control apparatus to be described, there are some functions which the generator B performs acting as an induction squirrel cage motor.

The brake 20—21, reproduced in Fig. 2, has the winding 22 thereof connected to the mains 31 and 32. The brake 24—25 on the shaft of the motor A is reproduced in Fig. 2 and has the winding 27 thereof connected at one side through the wire 29 to the wire 32 and has the other side connected through a wire 40, contacts 41 and 42 on a controller to be described, and by a wire 43 to the wire 31.

The slip-ring secondary of the motor A is connected by wires 43, 44 and 45 to external resistances 46, 47 and 48 respectively, each resistance having a number of rheostat contact points arranged in circular groups, 49, 50 and 51 by which the amount of the resistance in the secondary circuit may be adjustably varied by a controller, comprising three arms, 52, 53 and 54 rotatively supported at the center of the circle of contact points. The arms engage the contacts and connect them together, through the arms, one contact in each group at a time, as the arms are rotated. A handle 55 is provided to rotate the arms in unison, and has thereon an operator's push button 56 arranged to close, when depressed, a normally open control switch 57.

The arm 53 has thereon a contact 58, which, in a final counter-clock-wise position of the arm 53, engages and connects the said contacts 41—42.

Other parts of the system will be described in connection with a description of the operation which now follows:

Assuming that the load 18 is at the bottom of the lift and therefore exerts no torque on the drum 15, (see Figs. 1 and 3), the controller arms 52, 53 and 54 will be in a normal position such as that illustrated, in which they are on intermediate ones of the contacts 49, 50 and 51, that is to say with some of the resistance 46, 47, 48 in the secondary circuit of the motor A. This resistance is predetermined to be of such value that when the motor A and generator B have their primaries connected to the supply mains, 34, 35, 36, the generator will run as a motor at substantially synchronous speed and the motor A, (see Fig. 1), will drive the spider 2 at one half of the speed at which the generator (motor) B drives the gear 7. Under these circumstances, with a differential of the type illustrated in Fig. 1, the power delivery shaft 4 will remain at rest. Assuming now that the motor A and generator B are at rest and it is desired to raise the load 18, the motor and generator are first started and brought up to their said respective speeds, both as motors, in the following manner.

With the controller in the position referred to, the operator presses the push button 56, closing the switch 57, whereupon current flows from the main 34 through a wire 59, through the switch 57 and back by a wire 60 and through the switch winding 38 and thence through a limit switch 61 and a stop switch 62, both of which are normally closed, to the main 36, and closing the switch 37. Current then flows to the primary of the generator B causing it to start as a motor and come up immediately to its full synchronous speed; and current flows to the motor A bringing it up to the said intermediate speed.

In some cases, to insure that one unit will not try to drive the other through the differential gearing while being thus accelerated from rest, the brake 20—21 is employed to hold the shaft 4 at rest during the short interval in which the units A and B are being accelerated as motors up to their said speeds.

After they have attained their speeds, the shaft 4 will remain at rest without the brake 20—21. It is only necessary therefore for the brake 20—21 to hold the shaft 4 at rest for a very short interval of time, inasmuch as the two units are starting without any load thereon except that of inertia and friction in the gearing 1. I have found therefore that an ordinary electro-magnetic brake of the slow acting type is sufficient.

In this connection it will be observed that magnetic brakes in general tend to operate slowly due to both mechanical and electrical inertia and that special provisions must be resorted to when it is desired to have a magnetic brake operate quickly. It therefore follows that a magnetic brake without such special provisions has inherent in it sufficient inertia to delay its release after being energized, sufficiently long for the free acceleration of the motors A and B to take place.

If for any reason it be desired to utilize a quick acting brake, or if for any reason the motors accelerate slowly enough to require a longer time interval, the arrangement in Fig. 4 may be employed. Here the connection of the winding 22 to the wires 31, 32 and 33 is made through a delayed operation switch 63, operated by a winding 64 which receives current from the wires 31—32, upon closure of the switch 37. The delayed operation switch illustrated is timed by a dash-pot device 65, but it will be understood that this showing is merely diagrammatic and that any other principle of delaying the operation of the switch for a predetermined time interval may be employed instead.

To hoist the load, the operator moves the handle 55 toward the right which causes the arms 52, 53, 54 to cut some of the resistance out of the rotor circuit, which increases the speed of the motor A. The direction of rotation of the motor A and generator (motor) B are those indicated by the arrows on their respective bevel pinions 10 and 12. When, now, the motor A speeds up to its intermediate speed, the spider 2, being rotated at a higher speed, turns the gear 6 and the shaft 4 and the drum 15 in the hoisting direction. As soon as sufficient load develops on the drum 15 to cause the gear 6 to resist the torque applied thereto by the spider pinions 3—3, these pinions react upon the gear 7 applying torque thereto in the direction tending to drive the generator B beyond the synchronous speed at which it is running as a motor.

The generator B now delivers electric power back to the mains 34, 35, 36, and inherently resists being driven above its said synchronous speed and inherently tends to maintain the speed within a limited range of speeds; and I have utilized this inherent tendency in the present invention in a novel manner. In the operation of hoisting just referred to, the generator B functions as a fulcrum on which the motor A acts to raise the load, the speed of the generator B increasing a limited amount above its synchronous motor speed. The generator B therefore actually operates at variable speed but within a speed range, automatically limited by its speed torque characteristics, illustrated in Fig. 5 and described above; the maximum speed being determined by the maximum load.

For high speeds if the controller arm 55 be moved farther and farther toward the right, the speed of hoisting will be higher and on the last point in that direction, the rotor of the motor A is short circuited, as can be seen from the diagram Fig. 2, and running at its synchronous speed, and the speed at which it drives the gear 6 and the shaft 4 is twice the speed at which it drives the spider 2. It will be seen therefore that a very wide variation of hoisting speed is provided from zero to maximum.

To stop hoisting the load and to hold it suspended, the controller is brought back toward the intermediate speed position until the gear 6 and the hoist drum 15 stop turning; that is until a speed of the motor A is reached at which its torque on the gear 6 balances that of the load.

To lower the load, the controller arm 55 is moved farther toward the left, which increases the resistance in the rotor circuit of the motor A causing it to slow down, that is, to be driven at a slower speed. The motor A then applies insufficient torque to the gear 6 to balance the load on the drum, and allow it to descend. The motor A is not driven by the descending load but supplies its power at a reduced speed which, through the differential gearing, causes the load to go down, the reaction during lowering also being upon the generator B, driving it above synchronism, but being resisted by the characteristics of the generator as described above.

When the load is a very light load, such for example, as an empty hook as indicated at 68 in Fig. 3, the load may be raised as described above. To lower such a very light load, there may in some cases be sufficient friction in the bearings of the drum 15 and the shaft 4 and in the teeth of the engaged gears, to hold the gear 6 stationary so that the generator B will maintain the motor A at a speed higher than that for which the controller is set, so that no lowering will take place, the said friction supporting the empty hook 68 in suspension.

In such cases the brake 24—25 on the shaft of the motor A may be employed. To effect lowering of a light load or empty hook with this arrangement, when the handle 55 of the controller is moved to the extreme left hand position, the contact 58 engages the contacts 41—42 whereupon current flows from the wire 29 through the winding 27 of the brake 24—25, and over the circuit 40, 41, 42, 43, energizing the said brake and causing it to slow down or stop the shaft of the motor A. This stops or slows down rotation of the spider 2, and thereupon, the generator B which is still connected to the supply mains will run at approximately synchronous speed as a motor and drive the gear 7, and transmitting its movement through the pinions 3—3 will turn the gear 6 in the reverse direction, and drive the load down. Such down drive will be at high speed due to the high speed of the motor B. Obviously the brake 24—25 may be a very small and inexpensive brake.

As an alternative mode of operation, instead of braking the motor A to slow it down or stop it, for lowering light loads, the motor A may be supplied with current in the reverse direction. The pinions 3—3 of the spider will then react upon the gear 7 and drive the gear 6 in the reverse or hoist lowering direction.

Figure 6:
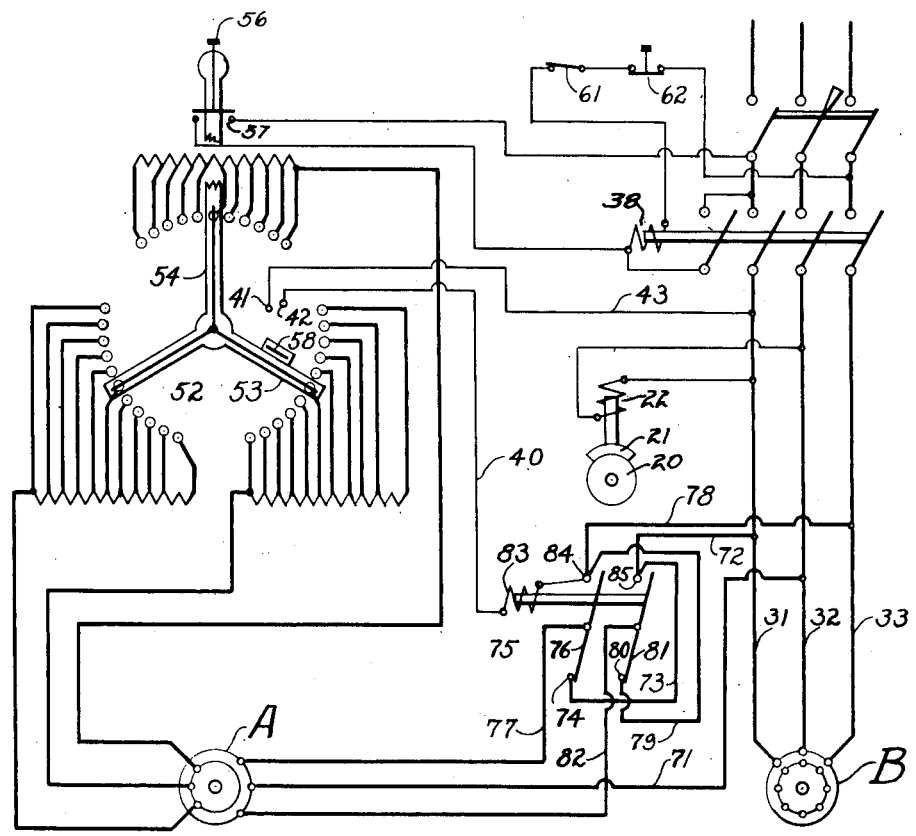
Fig. 6 is a view similar to Fig. 2 illustrating a modification.

A suitable control system for this alternative mode of operation is shown in Fig. 6. It is generally similar to Fig. 2 except that it employs a reversing arrangement for the primary of the motor A instead of the brake 24—25 as follows: Current to the primary of the motor A is supplied to one phase by a wire 71 directly from the wire 32. Another phase is supplied from the wire 31 by a wire 72 and a wire 73 to a contact 74 of a reversing switch shown generally at 75, the current then flowing through an arm 76 of the switch and by a wire 77 to the motor A. Current to the third phase flows from wire 33 by a wire 78 and a wire 79 to a contact 80 of the reversing switch 75 and thence by a switch arm 81 and wire 82 to the motor A. The switch 75 is normally in the position illustrated at which the above described circuits are established for the forward direction of the motor A.

When the controller switch arm 53 moves its contact 58 to engage the contacts 41 and 42 as described in connection with Fig. 2 current flows from the wire 31 by way of the above described wire 33, contacts 41 and 42 and by wire 40 to the winding 83 of the switch 75 and thence by wire 78 to the wire 33.

The switch 75 is thereby operated and the switch arms 76 and 81 disengage the contacts 74 and 80 and engage contacts 84 and 85. Thereupon motor current in the wire 78 flows through the contact 84 and switch arm 76 to the wire 77, and current in the wire 72 flows through contact 85 and switch arm 81 to the wire 82 thus reversing the direction of the current in the wires 77 and 82.

Whereas in the form of Fig. 2 when the contacts 41 and 42 were engaged to set the brake 24—25, the arms 52, 53, 54, had left the last point of the resistance and the circuit of the rotor of the motor A was open, in the form of Fig. 6, the contacts 41 and 42 are engaged when the arms 52, 53 and 54 are on the last point of resistance so that the rotor of the motor A is closed, but with the maximum of resistance in its circuit. Therefore, although the primary of the motor is reversed, it drives the motor at relatively slow speed. But the slow speed of the motor A in the reverse direction effects a very rapid rotation of the gear 6 and shaft 4 due to the fact that the gear 7 runs at or near the synchronous speed of the generator B in its original direction.

Referring again to the form of Fig. 2, it is preferred that after the push button 56 has once been operated it may be released, and to this end a holding circuit for the switch 37 is provided by way of a switch 69 and a wire 70, the switch 69 being closed upon operation of the switch 37 by the winding 58. Thereafter to stop the motor and generator, the stop switch 62 may be operated to de-energize the winding 38. Obviously the limit switch 61 will likewise stop both units, if it be opened, and therefore, limit switches such as the switch 61 may be provided at either the top or bottom or both of the lift. Upon operation of the switch 62 (or switches such as 61) the power is interrupted by opening the switch 37, whereupon, the brake winding 22 being de-energized, the brake 20—21 will set and bring the load to rest and hold it, whether during the hoisting or lowering. The same functions of this brake will be performed in the case of power failure.

A similar mode of operation for the push button 56 and the switches 61 and 62 may be had with the form of Fig. 6, which it is believed will be clear without further description.

Figure 7:
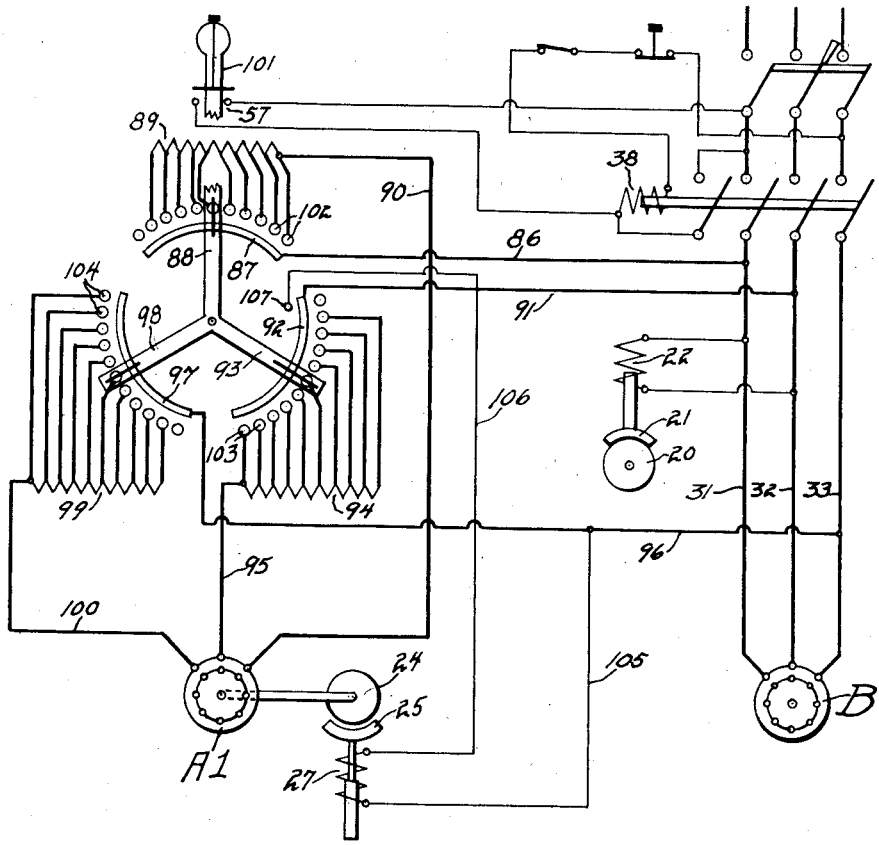
Fig. 7 is a view similar to Fig. 2 illustrating another modification.

In Fig. 7, I have illustrated an arrangement which in general is similar to that of Fig. 2, except that in this case, the motor A—1 driving the differential spider is a squirrel cage induction motor, and to adjustably vary its speed, variable resistance is provided in its primary circuits.

To this end, current for one phase of the primary winding flows from the supply wire 51, by a wire 86 to a controller segmental contact 87 and thence through a controller arm 88, to resistances 89, and by a wire 90 to the motor; and similarly current flows from the supply mains 32 by a wire 91 to contact 92, and by an arm 93, through resistances 94, and by a wire 95, to another primary phase; and current flows from the wire 33 by a wire 96 to a controller contact 97, and thence by an arm 98 to resistance 99, and by a wire 100, to the third phase of the primary of the motor A—1.

By the arrangement shown, when the controller handle 101 is moved to the right or to the left, the arms 88, 93 and 98 move over steps of contacts 182, 183, 184 to vary the resistance in each of the phases of the primary in a well known manner.

The operation of this form of the invention is substantially the same as that described in connection with Fig. 2. The winding 27 of the brake 24—25 is energized by current flowing from the supply wire 33, and by a wire 105, through the winding 27 and by a wire 106 to a contact 107, which, when the controller arms are on the last point position at which the primary of the motor is opened and de-energized, is connected through the arm 93 to the contact 92, and thence by the wire 91 to the supply main 32.

From the foregoing it will be seen that both motor A, and generator B acting as a motor, drive their respective differential gear elements in the same direction and that therefore to obtain a wide range of speeds it is only necessary to vary the speed of one motor, the motor A. It will also be seen that the speed of the gear 7 varies within only a limited range due to the fact that the generator B is always connected directly to the supply mains and tends to run at synchronous speed, this function being provided by the inherent torque characteristics of the induction squirrel cage type of generator employed. The generator B functions as a speed determiner for the system, delivering no power to the hoist system but giving power back to the mains and concurrently acting as a reaction point upon which the motor A may operate to both raise and lower the load. By causing one of the gears, such as the gear 7, of the differential to run always at a speed within a limited speed range, regardless of the load thereon, and by taking the power from the other gear, such as the gear 6, the power supplying motor A may be connected to the spider as described and the speed of the power delivery varied from zero to a high maximum speed by variations of the speed of the motor A only. The maximum of simplicity, flexibility and reliability of the control system and of the manual operation or control thereof results.

It is an important advantage of my invention that throughout a wide range of load speeds, from maximum in one direction through zero to maximum in the other direction, the speed of the intermeshed gears of the differential gearing never attain high pitch line contact velocity, with the result that wear on the gear teeth and loss of power are negligible. In prior differential gear transmissions, for example of the type in which power is applied to one or another of the side gears and taken out at the spider, under which conditions it is necessary at either forward or reverse speeds, to revolve the side gears in opposite directions, any considerable range of speed of power delivery must necessitate such high pitch line contact velocity at the gear teeth as to create excessive and often prohibitive wear and prohibitive power loss.

My invention is not limited to the exact details of construction illustrated and described nor to the exact arrangement of the circuits of the systems of Figs. 2, 6 and 7. Many changes and modifications may be made within the spirit of my invention without sacrificing its advantages and within the scope of the appended claims.

I claim:

1. In an electric hoisting apparatus, a differential gearing, comprising a spider element carrying a pinion and a pair of gears each meshed with the pinion, a hoist drum connected to one gear, an alternating current electro-dynamic device comprising a primary and a secondary, one being a rotor and the other a stator, and the primary being connected directly to alternating current supply mains and energized always by the voltage thereof and the rotor being connected to the other of said gears and having a synchronous speed at which it tends to run at no load on the rotor, a variable speed alternating current motor connected to the spider, means to drive it at variable speeds, said means providing one speed at which, with the said device running, it causes the said one gear to remain at rest and providing other speeds at which the one gear and drum are driven, and, at all speeds of the one gear, the said device providing yielding torque upon which the spider reacts to drive the said one gear and drum, and the said device supplying current back to the alternating current supply mains.

2. In an electric hoisting apparatus, a differential gear comprising a spider carrying a pinion and a pair of gears meshed with the pinion, a hoist drum connected with one gear, an alternating current electro-dynamic device comprising a primary and a secondary one of which is a rotor, the rotor being connected to the other gear, a variable speed slip-ring induction motor connected to the spider, a source of alternating current, an electric controller comprising switch means for connecting the primary of the said device directly to the source and for always energizing it at the source voltage tending to cause the rotor thereof to run at a synchronous speed, the controller comprising means for connecting the primary of the variable speed motor to the source and comprising a rheostat having an intermediate speed resistance point at which the variable speed motor drives the spider at one half of the speed at which the said other gear runs when the rotor of the said device is at synchronous speed, and no load is on said one gear and drum, and having higher and lower speed resistance points at which the slip-ring motor drives the spider and causes the one gear and drum to rotate in hoisting or lowering direction at adjustable speeds in either direction at which speeds the reaction of the load causes the rotor of the said device to be rotated above the synchronous speed thereof by said other gear and causes it to exert a dynamic braking action thereon and to cause it to rotate at variable speeds within a limited speed range.

3. In an electric hoisting apparatus a differential gearing of the type comprising a spider carrying a pinion and a pair of gears meshed with the pinion, alternating current supply mains, a slip-ring alternating current induction motor having a primary energized by current from the mains and connected to the spider to drive it, a rotary hoist drum connected to one gear to receive torque therefrom during hoisting direction of rotation of the drum and to give torque thereto during lowering direction of rotation of the drum, an alternating current electro-dynamic device comprising a primary and a secondary one of which is a rotor connected to the said other gear and the primary being connected directly across the supply mains and always energized by the voltage thereof, whereby the rotor tends to run at a synchronous speed and to drive the said other gear at no load on the drum, and the rotor of the said device being driven above its synchronous speed by the said other gear at loads on the drum and then exerting dynamic braking action on said other gear to hold its speed within a limited speed range, and a rheostat for the secondary of the slip-ring motor to increase its speed for hoisting and decrease it for lowering.

4. In an electric hoisting apparatus a differential gearing of the type comprising a spider carrying a pinion and a pair of gears meshed with the pinion, alternating current supply mains, a slip-ring alternating current induction motor having a primary energized by current from the mains and connected to the spider to drive it, a rotary hoist drum connected to one gear to receive torque therefrom during hoisting direction of rotation of the drum and to give torque thereto during lowering direction of rotation of the drum, a squirrel cage induction motor connected to the other said gear and always energized directly by the full voltage of the supply mains, to run at synchronous speed and drive the said other gear at no load on the drum, and driven above synchronous speed by the said other gear at loads on the drum, and then exerting dynamic braking action on said other gear to hold its speed within a limited speed range, and a rheostat for the secondary of the slip-ring motor to increase its speed for hoisting and decrease it for lowering.

5. The apparatus described in claim 4 and in which is provided a mechanically set, electromagnetically releasable brake, for holding the said one gear stationary during acceleration of the squirrel cage motor from rest to full speed, and acceleration of the slip-ring motor from rest to intermediate speed, at which speeds no torque is applied to the said one gear, and in which the rheostat has a resistance point corresponding to said intermediate speed, and in which a circuit for the brake is provided to cause it to release substantially at the end of said acceleration of the motors.

6. In an electrical hoisting apparatus a differential gearing comprising a spider carrying a pinion and two gears meshed with the pinion, a source of alternating current, a slip-ring motor connected to the spider, a hoist drum connected to one gear, a squirrel cage induction motor connected to the other gear, a rheostat for the secondary of the slip-ring motor, a switch controlling supply of current from the source, a mechanically set brake for holding the one gear stationary and electrically energizable to release it, the rheostat having an intermediate resistance point at which the slip-ring motor drives the spider at one half the speed at which the squirrel cage motor running at synchronous speed drives the said other gear, electric circuits whereby when the rheostat is set at said intermediate resistance point and the switch is operated, current from the source substantially simultaneously energizes the brake and the primary of both motors to cause the slip-ring motor to accelerate to said intermediate speed and the squirrel cage motor to accelerate to synchronous speed, and means to cause the brake to then release the one gear.

7. In an electric hoisting apparatus a differential gearing comprising a spider carrying a pinion and two gears meshed therewith, a hoist drum connected to one gear, a slip-ring motor having a secondary rheostat connected to the spider, a squirrel cage induction motor connected to the other gear, a source of current, switch contacts and circuits controlled thereby for substantially simultaneously connecting the primaries of both motors to the source to accelerate them from rest, the rheostat having an intermediate resistance point for causing the slip-ring motor to accelerate to the speed at which it will drive the spider at one half the speed at which the squirrel cage induction motor, accelerated to full speed, drives the other gear, causing the said one gear to remain at rest, the rheostat having other resistance points at which the slip-ring motor drives the spider at higher or lower speeds respectively to drive the said one gear and drum in the hoisting or lowering direction and to cause the spider to react on the said other gear to apply torque on the squirrel cage motor to drive it at speeds above synchronous speed as a generator to cause it to exert a braking action on said other gear and to hold its speed within a limited speed range.

8. The apparatus described in claim 4 and in which a reversing switch is provided to reverse the direction of power application to the slip-ring motor to cause the squirrel cage motor running at synchronous speed to act through the said other gear and spider and drive the said one gear to effect hoist lowering of light loads.

9. In an electric hoisting apparatus, a differential gearing comprising a spider carrying a pinion and two gears meshed with the pinion, a hoist drum connected to one gear, a slip-ring induction motor connected to the spider, a squirrel cage motor connected to the other gear, a source of alternating electric current, a controller comprising a rheostat for the slip-ring secondary, having an intermediate resistance point at which, with no load on the drum, the slip-ring motor will drive the spider at one half the speed at which the squirrel cage motor drives the said other gear, an electric circuit for energizing the slip-ring motor primary from the source, and an electric circuit for energizing the squirrel cage motor directly from the source, the rheostat having other resistance points at which the slip-ring motor drives the spider at higher and lower speeds respectively to effect the driving of said one gear and drum in the hoisting or lowering direction and to cause the spider to react on the said other gear, causing it to drive the squirrel cage motor above synchronous speed as a generator and to exert a braking action on said other gear to hold its speed within a limited speed range, a last point on the rheostat at which the slip-ring secondary is opened, an electric control circuit closed on said last point, an electrically actuated brake energized by current from the source in said control circuit and arranged to retard rotation of the slip-ring motor to cause the squirrel cage motor to drive the said other gear and through the spider to drive the said one gear to cause it to effect lowering of light loads on the drum.

10. In an electric hoisting apparatus, a differential gearing comprising a spider carrying a pinion and two gears meshed with the pinion, a hoist drum connected to one gear, a slip-ring induction motor connected to the spider, a squirrel cage motor connected to the other gear, a source of alternating current, a controller comprising a rheostat for the slip-ring motor secondary, having an intermediate resistance point at which with no load on the drum the slip-ring motor will drive the spider at one half of the speed at which the squirrel cage motor drives the said other gear, an electric circuit for energizing the slip-ring motor primary from the source, and an electric circuit for energizing the squirrel cage motor directly from the source, the rheostat having other resistance points at which the slip-ring motor drives the spider at higher or lower speeds, respectively to effect the driving of said one gear and drum in the hoisting or lowering direction and to cause the spider to react on the said other gear, causing it to drive the squirrel cage motor above synchronous speed as a generator and to exert a braking action on said other gear to hold its speed within a limited speed range, a last point on the rheostat at which, with all of the rheostat resistance in the secondary circuit of the slip-ring motor, an electric control circuit is closed, an electrically actuatable reversing switch energized by current from the source in said control circuit and arranged to reverse the source current to the primary of the slip-ring motor to cause it to rotate slowly in the reverse direction to cause the squirrel cage motor to drive the said other gear and through the spider to drive the said one gear to cause it to effect lowering of light loads on the drum.

11. In an electric power drive, a differential gearing comprising a spider element carrying a pinion and a pair of gears each meshed with the pinion, one gear being arranged to have a load to be driven connected thereto, an electro-dynamic device comprising a stator and a rotor, connected to a source of voltage and always energized thereby and the rotor being connected to the other said gear and having a speed at which it tends to run, a variable speed electric motor connected to the spider, means to drive it at variable speeds said means providing one speed at which, with the said device running, it causes the said one gear to remain at rest and providing other speeds at which the one gear and load are driven, and, at all speeds of the one gear, the said device providing yielding torque upon which the spider reacts to drive the said one gear and load, and the said device acting as a generator supplying current back to the said voltage source.

12. In an electric power drive, a differential gearing comprising a spider element carrying a pinion and a pair of gears each meshed with the pinion, one gear being arranged to have a load to be driven connected thereto, a squirrel cage induction motor the stator of which is connected to a source of alternating voltage and always energized thereby and the rotor of which is connected to the said other gear and has a speed at which it tends to run, a variable speed alternating current motor connected to the spider, means to drive the variable speed motor at variable speed, said means providing one speed at which, when the induction motor is running, it causes the said one gear to remain at rest, and providing other speeds at which the one gear and load are driven, and, at all speeds of the one gear, the induction motor providing yielding torque upon which the spider reacts to drive the said one gear and load, and the induction motor acting as a generator supplying current back to the voltage source.

LEV A. TROFIMOV.